Feb. 5, 1957  N. BYLSKI  2,779,986
FASTENER
Filed Jan. 4, 1955
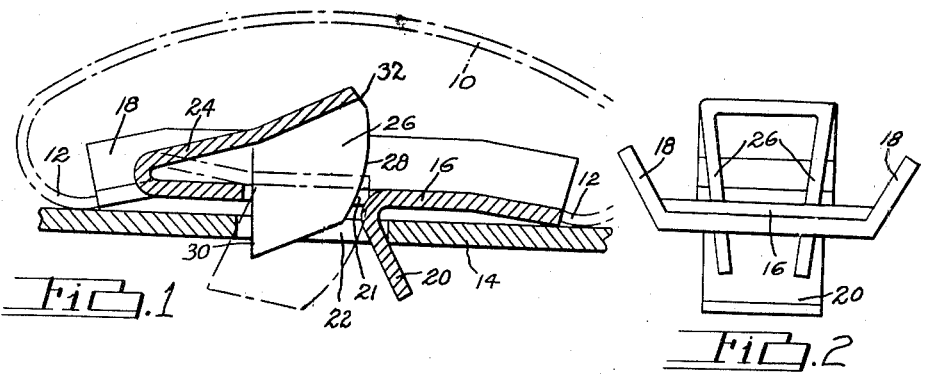
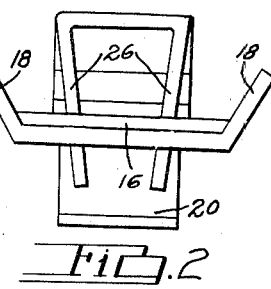
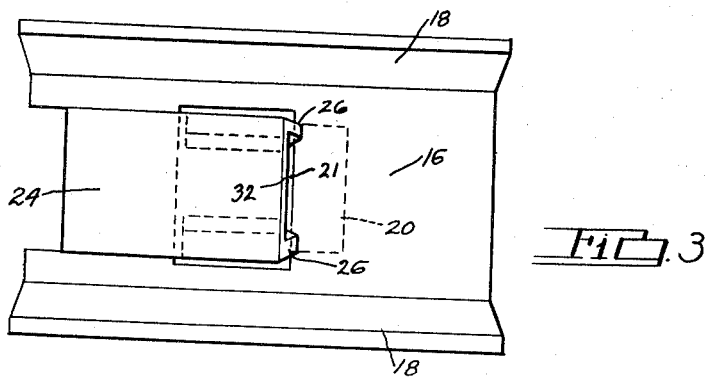
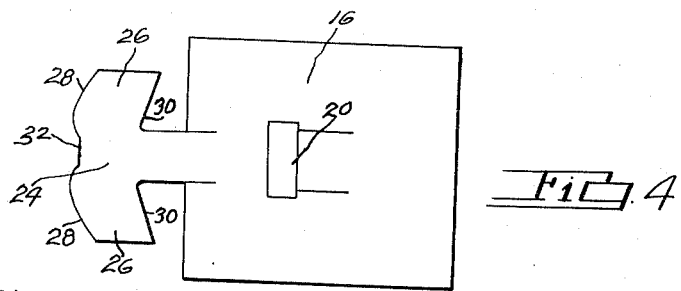
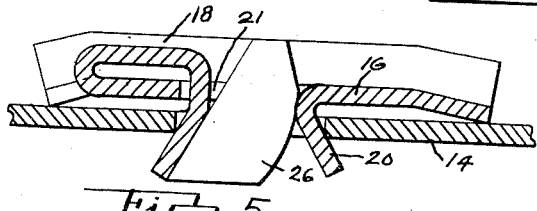
INVENTOR.
NORBERT BYLSKI
BY
HIS ATTORNEY

United States Patent Office 2,779,986
Patented Feb. 5, 1957

2,779,986

FASTENER

Norbert Bylski, Redford, Mich., assignor to Robert L. Brown, Ferndale, Mich.

Application January 4, 1955, Serial No. 479,700

2 Claims. (Cl. 24—73)

This invention relates to fastening devices and particularly to fastening devices for securing parts together or securing hollow members, such as moldings, to apertured supports.

A primary object of the invention is to provide a positive locking fastening device, having a hook-like projection which is so positioned as to be inserted through an aperture in a supporting member and by lateral movement of the fastener, the arm is brought into holding engagement with the underside of the supporting member.

Another object of the invention is to provide a second arm which is reversely bent over an aperture in the fastener body and is provided with divergent projections which can be forced into the aperture in engagement with the underside of the supporting member and is further provided with cam surfaces which wedge against the hook-like projection to urge both the hook-like projection and the divergent projections into locked position.

Other objects and advantages of the invention will more fully appear from the following description taken in connection with the accompanying drawings, in which:

Fig. 1 is a longitudinal sectional view of the improved fastener, showing the fastener in full lines as it is applied to a support and in dot and dash lines after it has been applied in locked position;

Fig. 2 is an end view of Fig. 1;

Fig. 3 is a top plan view of Fig. 1;

Fig. 4 is a top plan view of the sheet metal blank from which the fastener is formed; and Fig. 5 is a view corresponding to Fig. 1 but showing a modification of the fastener.

Referring to the drawings, a hollow molding 10, having inwardly turned flanges 12 is secured to a panel member 14 by securing the flanges 12 on the improved fastening device which is secured to the panel member 14. The fastener comprises a body portion 16 having upwardly and outwardly diverging flanges 18, the body portion 16 being bowed upwardly so that the end edges engage the panel 14 with the central portion of the body portion spaced upwardly away from the panel 14. This bowed portion causes the end edges of the flanges 18 to diverge upwardly and outwardly away from the end edges of the body portion 16. Stamped out of the central portion of the body 16 is a downwardly projecting tab 20 on the underside of the fastener forming an opening 21. This tab 20 is bent beyond a perpendicular plane to the plane of the body so as to provide a hook-like member for engagement with the edge of an aperture 22 in the panel 14.

At the end edge of the body, opposite to the direction of the hook member 20, is an outwardly extending tab 24. This tab is provided with outwardly projecting flanges 26 having their front edges cam shaped as at 28 and their rear edges 30 each directed toward the body portion 16. The flanges 26 are bent upwardly with respect to the body portion of the tab 24 at approximately right angles thereto forming, with the body portion of the tab 24, a channel shaped portion. The tab 24 is then reversely bent over the upper surface of body portion 16 of the fastener with the side flanges 26 of the channel over-lying the opening in the fastener formed by the downwardly bent tab 20. The tab 24 normally extends in divergent relation to the plane of the body portion 16 of the fastener with the edges 30 at right angles to the plane of the panel 14 and the flanges 26 are projected into the opening 21.

When the fastener is assembled to the panel 14, the tab 20 is inserted into the opening 22 and the flanges 26 are partially inserted in the opening 22. The tab 24 is then bent downwardly flush with the plane of the body portion 16 of the fastener, as shown by the dot and dash lines. This action causes the cam surfaces to ride along the bent back portion of the tab 20 forcing it tightly against the edge of the opening 22 in the panel 14 and it is firmly hooked over the edge of the opening. The edges 30 of the flanges 26, normally at right angles to the plane of the panel 14 but at an acute angle to the plane of the body portion of the tab 24, are urged into the opening at an angle and are forced into wedging engagement with the underside of the panel 14. By the action of the edges of the flanges 26 and the cam edge 28, the fastener is securely locked in the opening 22 of the panel 14. The portion of the edge 28, adjacent the tab 24, is cut back into the body of the tab, as shown at 32, so that when the tab 24 is forced downwardly into its locked position the cam surface is retained in its holding position.

If desired, the flanges 26 of the tab 24 may be bent downwardly so that when the tab is reversely bent over the body of the fastener, the edges of the flanges 26 are presented for forcing the flanges into the openings 21 and 22 and the body portion of the tab 24 which is the base of the channel is turned inwardly under the panel 14 as the flanges 26 are forced into the opening 22. The edges of the flanges 26 are cam shaped at 28 so that they force the tab 20 into holding engagement with the edge of the opening 22 in the panel 14. After the fastener is applied to the panel 14 the flanges 12 of the molding 10 are spring pressed over the edges of the tapering flanges 18.

A preferred form of the invention has been illustrated and described, but it is to be understood that various changes, including the size, shape and arrangement of parts, may be made without departing from the spirit of the invention and it is intended to cover by the appended claims such changes as may be reasonably included within the scope thereof.

I claim:

1. A fastener comprising a sheet metal body for application to one side of an apertured panel, a tongue stamped from the central portion of said body and integral at one therewith forming an opening therethrough and having its free end bent out of the plane at an acute angle to the plane of said body providing a hook for engaging an edge of the aperture in said panel, a tab integral at one end with said body portion bent back upon said body with its free end extending over the opening formed by the stamped tongue and initially in a plane inclined to the plane of said body, and a flange carried by the free end of said tab which is perpendicular to the plane of said tab projecting toward the opening formed by the stamped tongue, said flange being of progressively increasing width toward said tab for pressure engagement with said tongue and the opposite edge of the aperture in said panel when said tab is bent from its initial inclined plane to a position approaching a parallel position with the plane of said body.

2. A fastener comprising a sheet metal body for application to one side of an apertured panel, the body being bowed so that its opposite ends only have initial contact with the apertured panel at opposite sides of the aperture, a tongue stamped from the central portion of said body and integral therewith at one end forming an opening therein and having its free end bent out of the plane at an acute angle to the plane of said body providing a hook for engaging an edge of the aperture in said panel, a tab integral at one end with said body portion bent back upon said body with its free end extending over the opening formed by the stamped tongue and initially in a plane inclined to the plane of said body portion, and a flange carried by the free end of said tab which is perpendicular to the plane of said tab projecting toward the opening formed by the stamped tongue, said flange being of progressively increasing width toward said tab for pressure engagement with said tongue and the opposite edge of the aperture in said panel when said tab is bent from its initial inclined plane to a position approaching a parallel position with the plane of said body.

References Cited in the file of this patent

UNITED STATES PATENTS

| | | |
|---|---|---|
| 2,153,972 | Murphy | Apr. 11, 1939 |
| 2,257,855 | Place | Oct. 7, 1941 |
| 2,284,834 | Moler | June 2, 1942 |
| 2,476,207 | Brown | July 12, 1949 |
| 2,681,487 | Poupitch | June 22, 1954 |
| 2,682,693 | Poupitch | July 6, 1954 |